United States Patent
Anh

(12) 
(10) Patent No.: US 6,640,798 B2
(45) Date of Patent: Nov. 4, 2003

(54) FOOD CHAFER WITH RELEASABLY LOCKABLE ROLLTOP

(75) Inventor: Inhwan Anh, Kyungki Do (KR)

(73) Assignee: Carlisle FoodService Products, Incorporated, Oklahoma City, OK (US)

( * ) Notice: Subject to any disclaimer, the term of this patent is extended or adjusted under 35 U.S.C. 154(b) by 0 days.

(21) Appl. No.: 09/949,441

(22) Filed: Sep. 7, 2001

(65) Prior Publication Data

US 2002/0073984 A1 Jun. 20, 2002

(30) Foreign Application Priority Data

| Oct. 17, 2000 | (KR) | 30-2000-0026426 |
| Oct. 17, 2000 | (KR) | 30-2000-0026427 |
| Oct. 17, 2000 | (KR) | 30-2000-0026428 |
| Oct. 17, 2000 | (KR) | 30-2000-0026429 |
| Oct. 17, 2000 | (KR) | 30-2000-0028922 |
| Oct. 17, 2000 | (KR) | 30-2000-0026425 |

(51) Int. Cl.[7] ............................................. A47J 36/24
(52) U.S. Cl. ........................................ 126/33; 220/810
(58) Field of Search .......................... 126/33; 220/810, 220/831, 827; 403/93, 95, 96; 99/483

(56) References Cited

U.S. PATENT DOCUMENTS

| 1,783,630 A | * | 12/1930 | Schaeffer et al. | 403/93 |
| 3,583,734 A | * | 6/1971 | Magi | 403/96 |
| 4,463,632 A | * | 8/1984 | Parke | 403/93 |
| 5,119,800 A | | 6/1992 | Roberts et al. | 126/377 |
| 5,453,596 A | | 9/1995 | Verveniotis | 219/433 |
| 5,775,535 A | * | 7/1998 | Vercellone et al. | 220/318 |
| 5,788,196 A | * | 8/1998 | Forman | 220/252 |
| 5,819,640 A | | 10/1998 | Cuomo et al. | 99/483 |
| 5,977,521 A | | 11/1999 | Mehta et al. | 219/436 |
| 5,990,455 A | | 11/1999 | Scott et al. | 219/430 |
| 6,311,866 B1 | * | 11/2001 | Sambonet et al. | 220/830 |
| 6,460,453 B1 | * | 10/2002 | Frauenfeld | 126/33 |

FOREIGN PATENT DOCUMENTS

WO   WO 98/15215 A1 * 4/1998

OTHER PUBLICATIONS

Page 96 from a Sambonet Product Catalog.
Page 49 from a Libbey catalog.
Pages 102 and 103 from a Vollrath Smallwares + Light Equipment Catalog.
Spring Switzerland advertisement.
Carlisle FoodService Products catalog, pp. 68 and 69.
Three photographs showing a prior art latch mechanism on a food chafer.

* cited by examiner

*Primary Examiner*—Sara Clarke
(74) *Attorney, Agent, or Firm*—McAfee & Taft

(57) ABSTRACT

A food chafer with a releasably lockable rolltop is provided. The chafer structure includes a framework for supporting a water pan which in turn supports a food pan therein. The rolltop is rotatably mounted to the framework with a lock mechanism. The rolltop is releasably lockable in a partially open position which allows access to food in the food pan. The rolltop is movable from the partially open position in a direction toward a closed position or in a direction toward a fully open position simply by application of force in the desired direction of movement. The working parts of the lock mechanism are completely self-contained so that no manipulation of external parts to lock or unlock the rolltop is required.

33 Claims, 7 Drawing Sheets

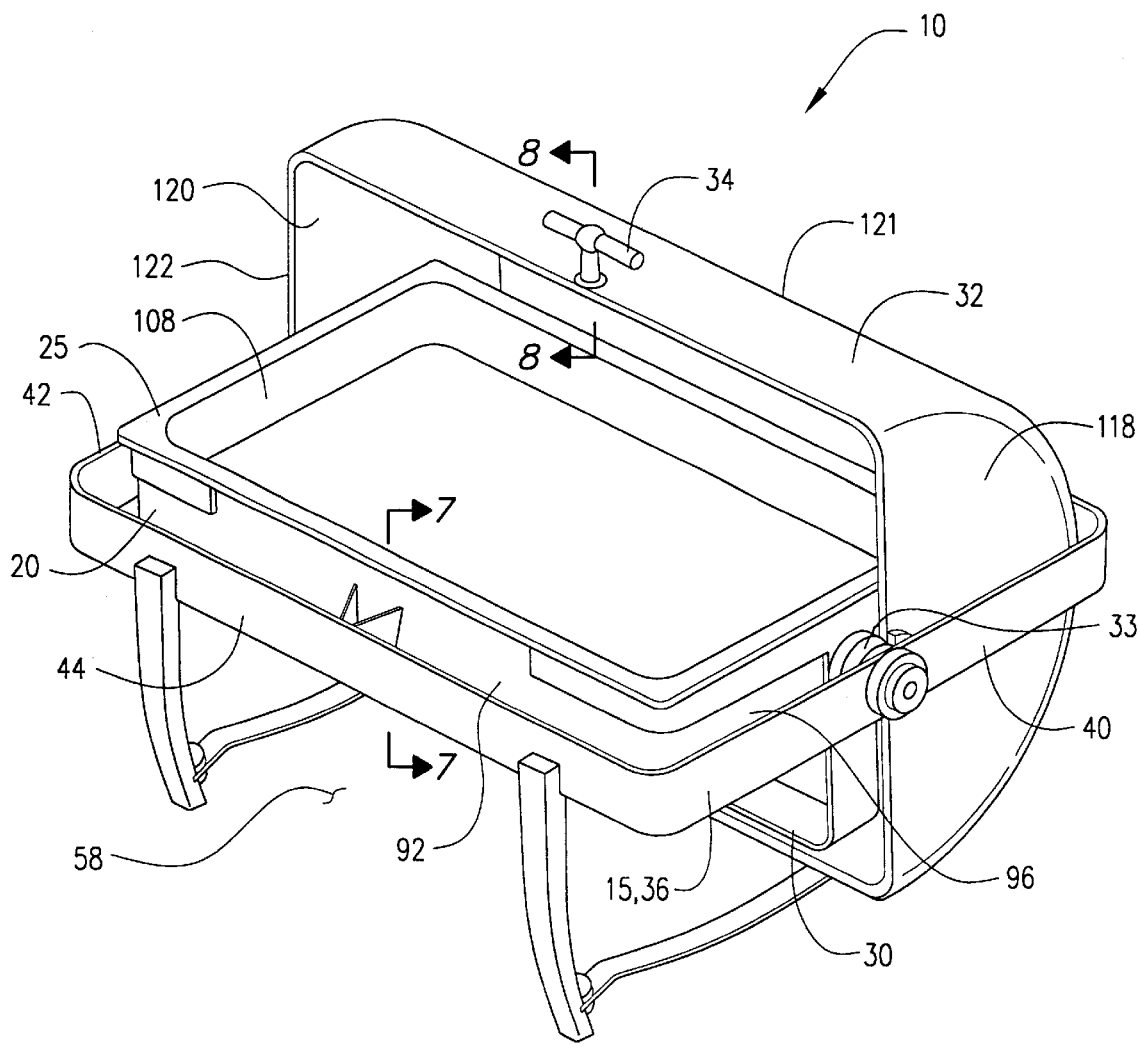
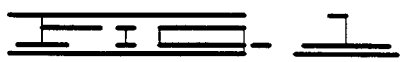

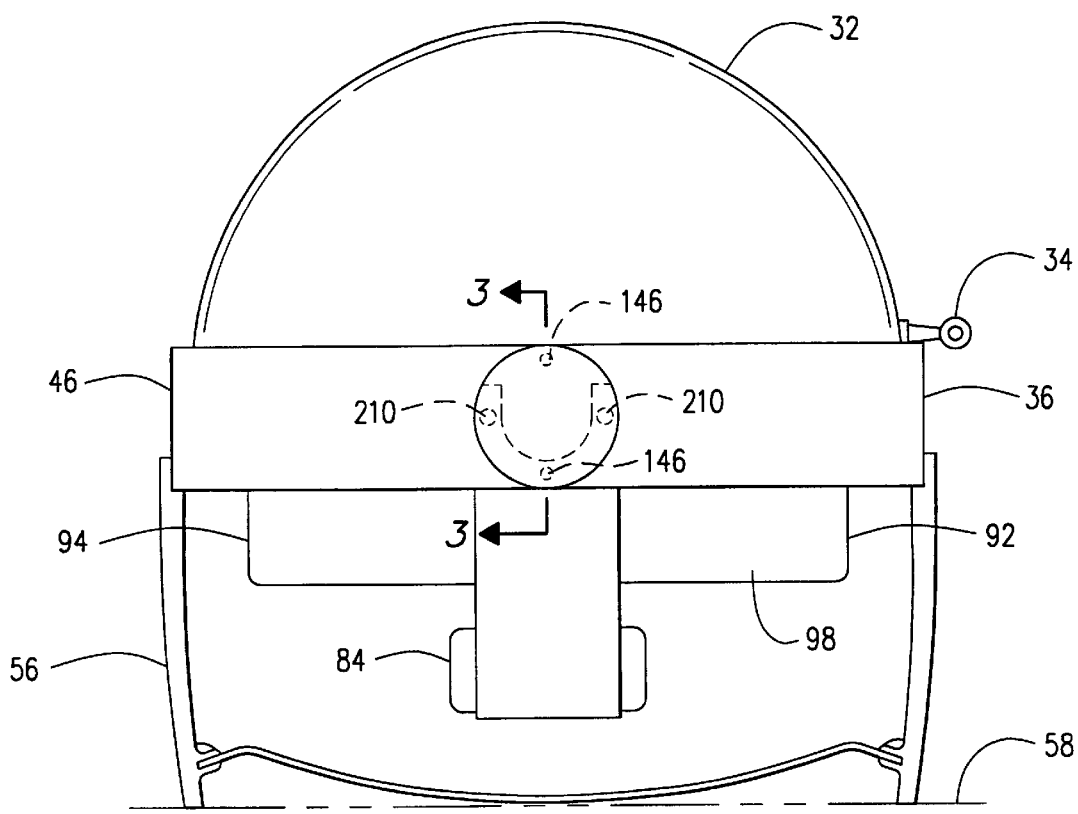
FIG. 2
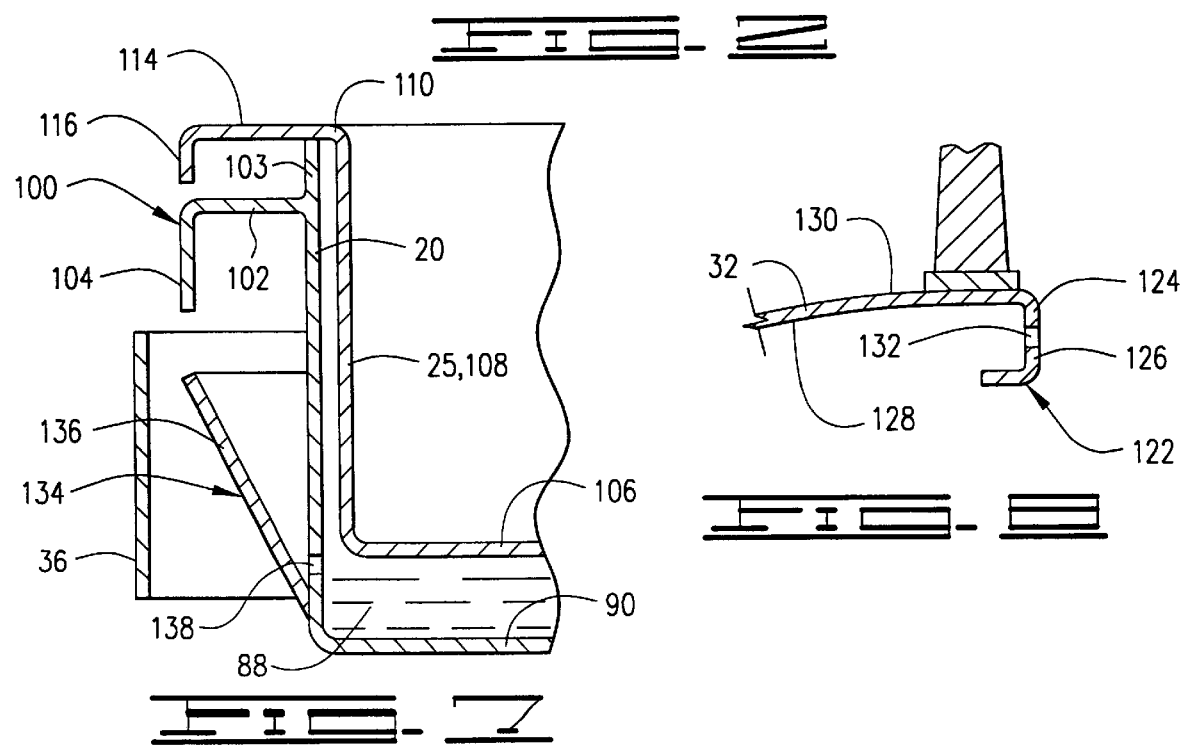
FIG. 7
FIG. 8

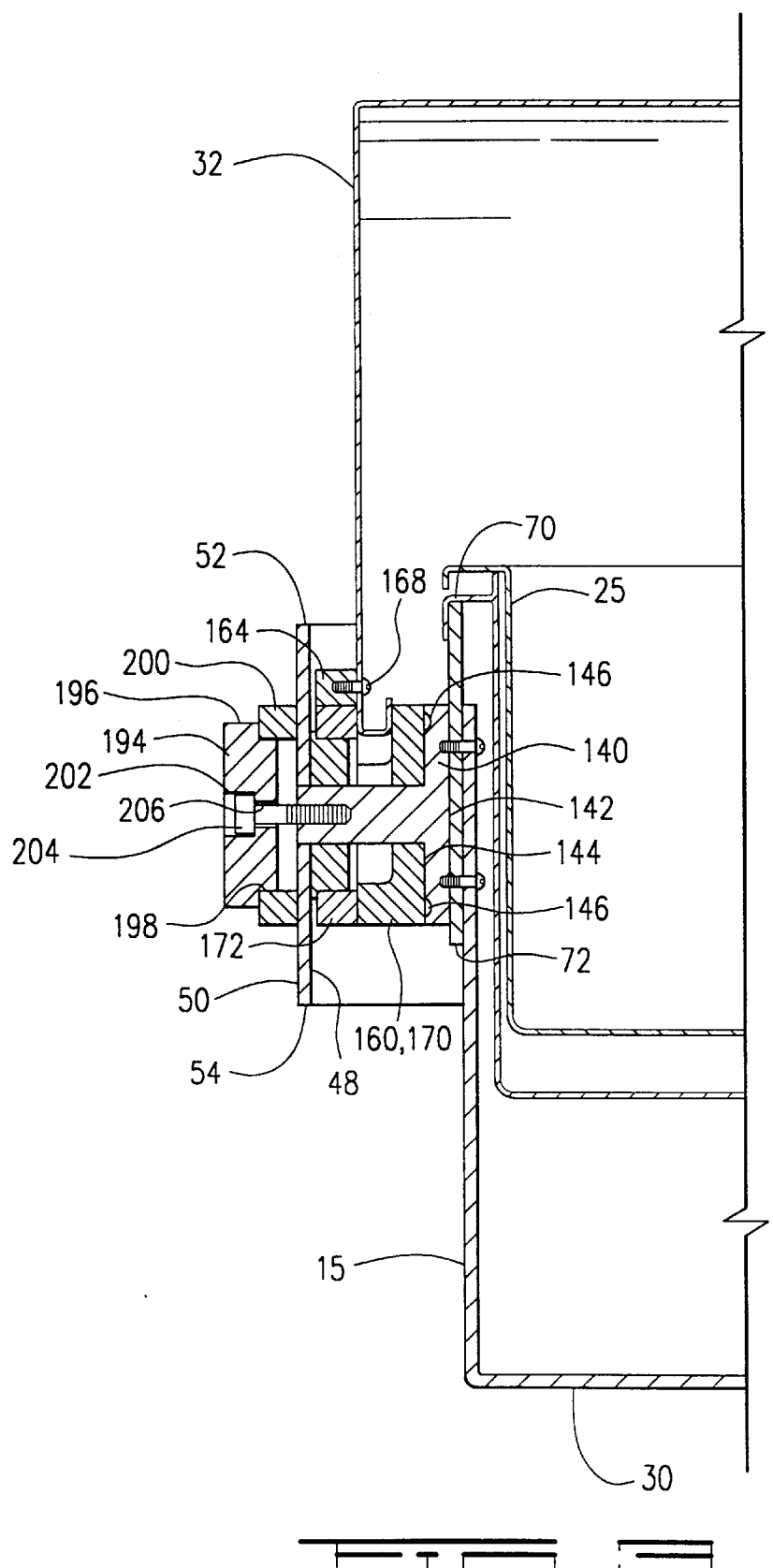

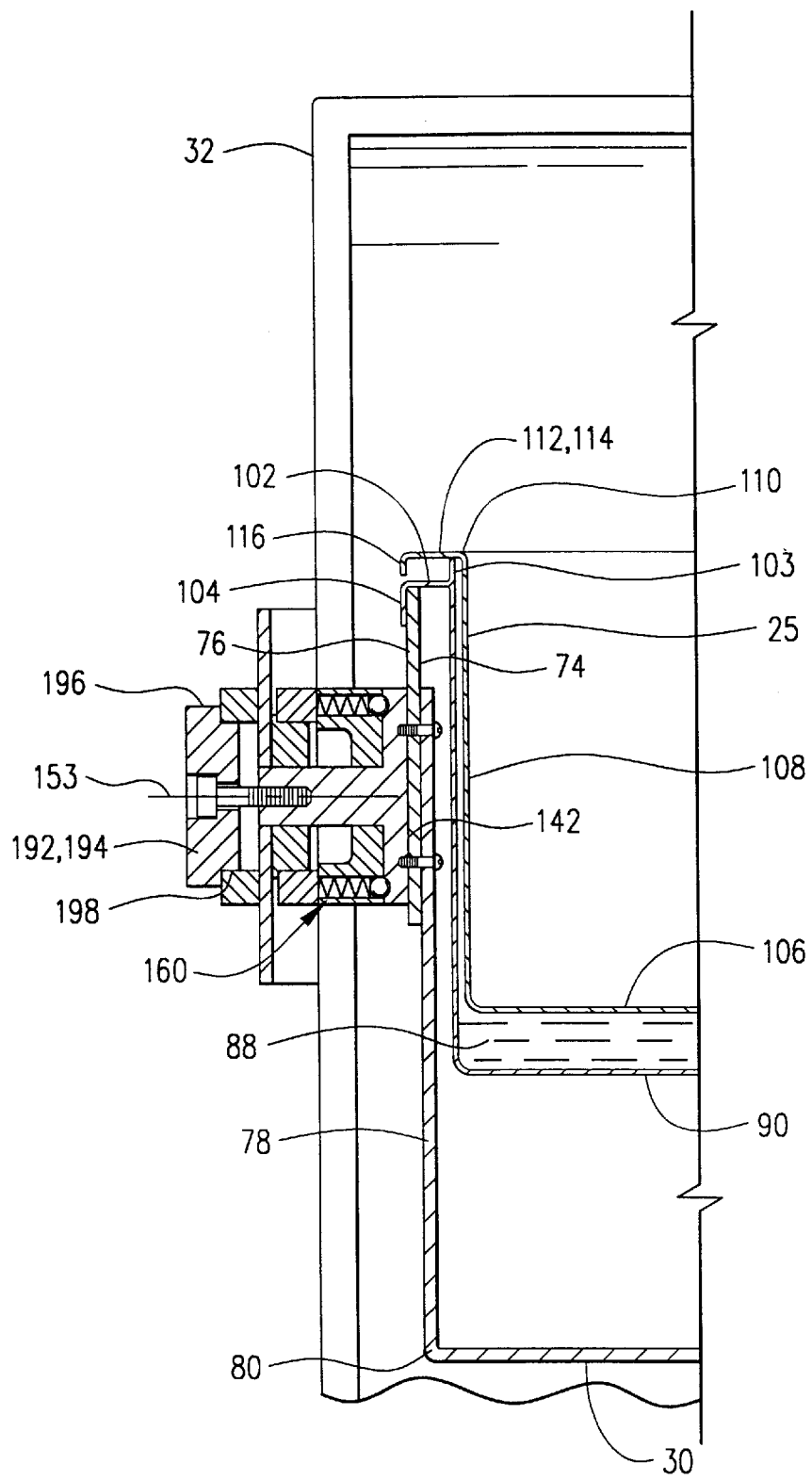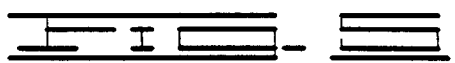

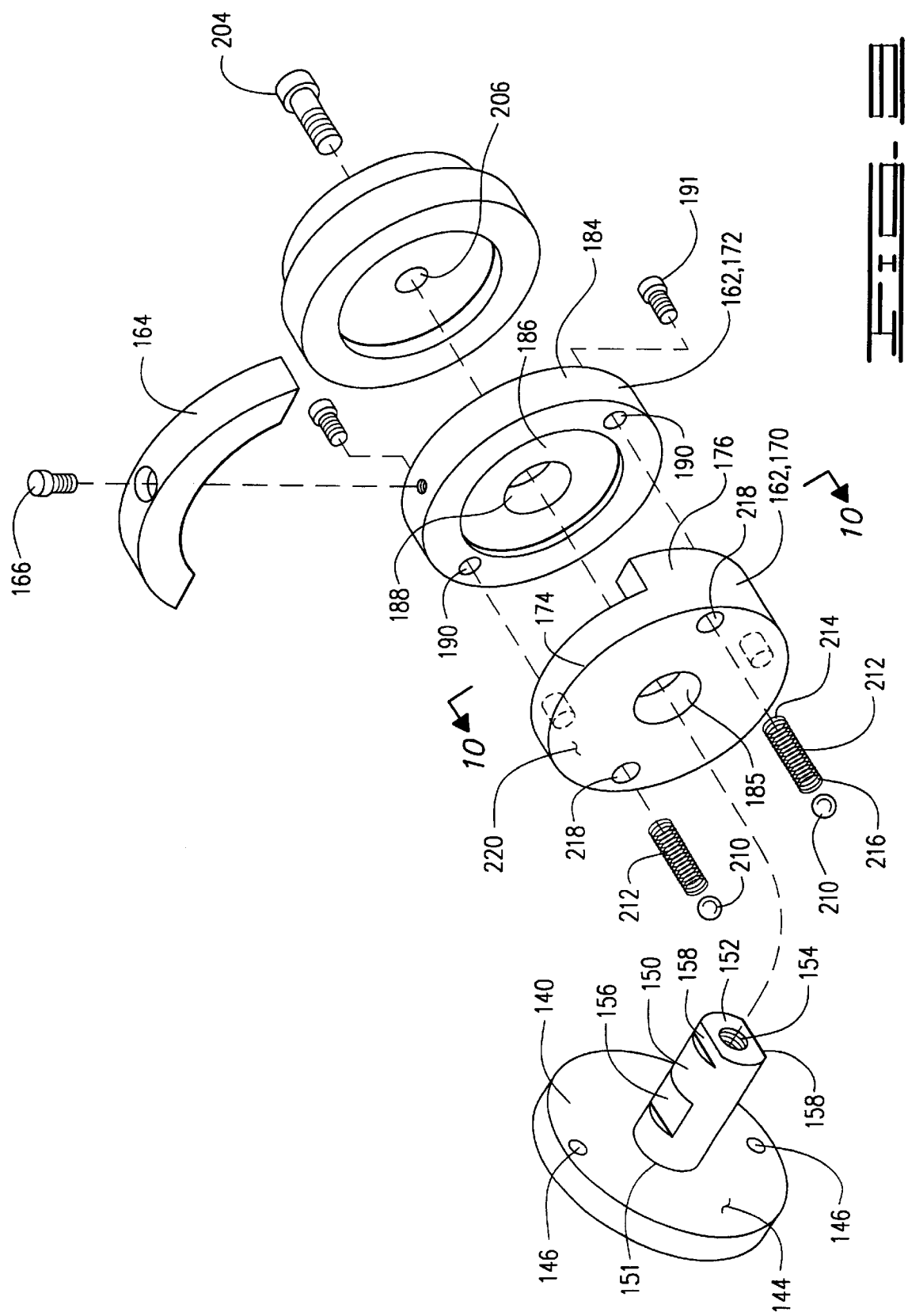

FOOD CHAFER WITH RELEASABLY LOCKABLE ROLLTOP

BACKGROUND OF THE INVENTION

The present invention relates generally to food chafers and more specifically to a food chafer having a rolltop that is releasably lockable in a desired open, or food service position.

Food chafers are portable food warmers or heaters that are widely used for buffet type food service, serving hors d'oeuvres and other purposes. Food chafers typically include a water pan supported by a frame and a food pan supported by the water pan above the level of water in the water pan. The food pan typically has a peripheral lip and will be supported by an outward flange or peripheral lip of the water pan. The water in the pan is heated by a heat source to keep the food in the food pan warm preferably at temperatures from 140° to about 190° Fahrenheit.

A number of food chafers have rotatable tops, typically referred to as rolltops. Rolltops are rotatably mounted to the food chafer frame and are moveable from a closed position which completely covers the food pan and thus the food therein, to a completely open position which allows the food pan to be removed. Thus the rolltop typically is rotatable at least through approximately 180° from the fully closed to the fully open position. There are some food chafers that allow the rolltop to be held in a partially open or food service position, which is typically 90° from the closed position and which allows access to the food pan so that food therein is accessible. Known mechanisms for holding a rolltop in a partially open, generally upright position to provide food access have exposed parts that can be aesthetically displeasing and, because of external exposure, create the possibility of foreign substance making contact with the food. One type of device for holding a rolltop in a desired open position utilizes a pin that must be inserted through a hole in an outer frame of the chafer. When the pin is inserted in the hole, the end of the pin creates an obstruction so that when the rolltop is being rotated upwardly from the closed position the pin will stop the movement of the rolltop in the desired position. However, if the pin slips out, or is removed, the rolltop will not be held in the desired partially upper position. Further, in order to move the rolltop from the upright to the fully open position, manipulation of the pins that hold the rolltop in the upright position is required. In other words, if it is desired to move the rolltop from the partially open position to the fully open position, present devices require the removal or retraction of the pin, separate from the rolltop, or manipulation of other devices separate from the rolltop before such movement is possible. There are no known chafers that will lock without manipulation of a device other than the rolltop itself, and that can be released for movement simply by manipulation or movement of the rolltop itself. Thus, there is a need for a releasably lockable rolltop that will allow movement from a locked, desired open position to the closed and to the fully open position from the desired open position with no manipulation other than simply moving the rolltop in the desired direction.

SUMMARY OF THE INVENTION

The present invention provides a food chafer comprising a framework with a rolltop rotatably connected to the framework. The framework supports a water pan for containing water. A food pan is typically supported by the water pan. The bottom of the food pan is spaced upwardly from water in the water pan. A shelf is positioned below the water pan for supporting one or more burners utilized to heat the water in the water pan and thus heat the food to maintain the food at a desirable serving temperature.

The rolltop of the present invention is a releasably lockable rolltop and is movable from a fully closed position, wherein the food pan supported by the framework is completely covered by the rolltop, to a fully open position wherein the food pan is accessible and may be removed from the chafer. The rolltop is releasably lockable in a desired open position between the closed and fully open positions which may also be referred to as a partially open or food service position. In the food service position the rolltop is typically rotated approximately 90° from the fully closed position. The present invention provides a rolltop that can be releasably locked in the partially open position and that can be moved back to the closed or to the fully open position from the locked desired open position simply by the application of force to the rolltop in the desired direction. Thus, to lock the rolltop in the desired open position, the rolltop is rotated to the desired open position where it will automatically lock in place. To release the rolltop for movement toward the fully open, or toward the closed position, the only manipulation required is the application of force to the rolltop in the desired direction.

The framework includes an outer rim with legs connected thereto and extending downward therefrom. An inner rim is spaced inwardly from the outer rim. The rolltop is rotatably mounted to the framework with a lock mechanism that is mounted to the framework. The lock mechanism includes a lug attached to the inner rim and an axle extending outwardly therefrom. A mounting hub is rotatably mounted on the axle and the rolltop is attached to the mounting hub. The invention preferably includes two lock mechanisms positioned on opposite sides of the framework.

The mounting hub houses at least one and preferably two biasing elements that are preferably springs disposed in passageways in the mounting hub. The springs engage a locking element and bias the locking element into engagement with the surface of the lug. The lug has one and preferably two lock receptacles, which are preferably cavities defined therein. In the closed position of the rolltop, the locking elements are urged into engagement with the outer surface of the lug. The lock receptacles in the lug are positioned such that rotation of the rolltop will cause the locking elements to engage the receptacles when the rolltop reaches the desired open position and thus will lock the rolltop in the partially open, or desired open position. The springs apply sufficient force to the locking elements such that the rolltop will be locked in the desired open position. If it is desired to move the rolltop from the desired open position to another position either toward the closed position or toward the fully open position, the only manipulation required is the application of force to the rolltop in the desired direction which will cause the locking elements to be removed from the lock receptacles, at which time the locking elements will simply slide along the outer surface of the lug until the rolltop is once again moved to the desired open position. The rolltop will again be releasably locked in that position. It is therefore a general object of the invention to provide a food chafer with a releasably lockable rolltop wherein the lock mechanism is completely self-contained and wherein the only manipulation required to releasably lock the rolltop in a desired open position is movement of the rolltop to the desired open position, and the only manipulation required to move the rolltop from its releasably locked position is the application of force in the desired direction of movement.

Other objects, features and advantages of the invention will become more readily apparent upon reference to the following description when taken in conjunction with the accompanying drawings.

BRIEF DESCRIPTION OF THE DRAWINGS

FIG. 1 is a perspective view of the chafer of the present invention.

FIG. 2 is a side view of the chafer of the present invention in its closed position.

FIG. 3 is a section view taken from line 3—3 of FIG. 2.

FIG. 5 is a cross sectional view taken from line 5—5 of FIG. 4.

FIG. 7 is a sectional view taken from line 7—7 of FIG. 1.

FIG. 8 is a cross sectional view taken from line 8—8 of FIG. 1.

FIG. 9 is an exploded view of the lock mechanism of the present invention.

DESCRIPTION OF A PREFERRED EMBODIMENT

Figure 6:
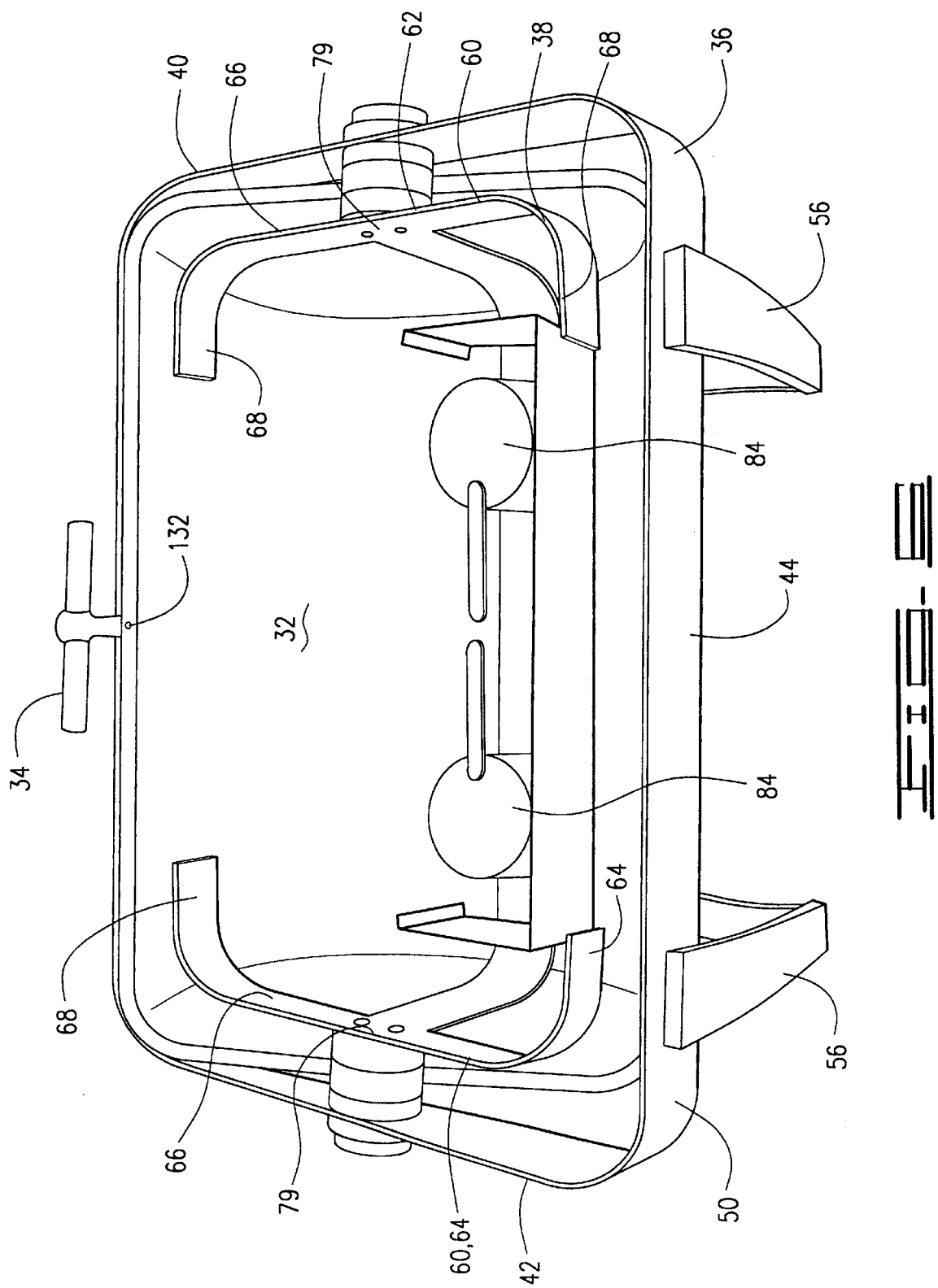
FIG. 6 is a perspective view looking down at the chafer of the present invention with the water pan and food pan removed.

Referring now to the drawings and more particularly FIG. 1, food chafer 10 of the present invention is shown. Food chafer 10 comprises a framework or frame 15 for supporting a water pan 20 and a food pan 25 above a shelf 30. A rolltop 32 is rotatably connected to framework 15 and is moveable from the closed position shown in FIG. 2 to a fully open position as seen in FIG. 6. In the fully open position, food pan 25 is accessible for removal. Rolltop 32 is releasably lockable in a partially open position, also referred to as a desired open position or food service position between the fully closed and fully open positions, such as for example the upright position shown in FIG. 1. Rolltop 32 is connected to framework 15 with a lock mechanism 33 and is releasably lockable such that it will lock in the partially open position simply by moving the rolltop to the partially open position. Rolltop 32 is moveable from the partially open, releasably locked position to either of the fully open or closed positions simply by applying a force to the rolltop in the desired direction of movement. For example rolltop 32 may be released from the locked position by grasping a handle 34 which may be attached to rolltop 32 and moving rolltop 32 in the desired direction of movement with handle 34. Frame or framework 15 includes an outer rim or outer ring 36 and an inner rim 38 spaced inwardly therefrom. Inner, or inward means toward an interior of the chafer, and outer, or outward means away from the interior of the chafer. In the embodiment shown outer rim 36 is generally rectangular shaped with rounded corners. Outer rim 36 thus has first and second ends 40 and 42, respectively and front and back sides 44 and 46 respectively. Outer rim 36 likewise has an inner surface 48, outer surface 50 and upper and lower edges 52 and 54 respectfully. Framework 15 includes legs 56 connected to and extending downwardly from outer rim 36. Legs 56 are supported on a support surface 58 which may comprise a tabletop, counter top, floor surface or any other desired support surface on which the chafer is desired to be placed.

Inner rim 38 comprises a pair of opposed support brackets 60. Support brackets 60, which may be referred to as opposed support brackets 62 and 64, each have an end portion 66 and side portions 68 connected to the outer ends of end portion 66 and extending inwardly therefrom. End portions 66 are preferably parallel to the ends 40 and 42 of outer rim 36 and side portions 68 are preferably parallel to sides 44 and 46 of outer rim 36. Thus, side portions 68 are preferably perpendicular to end portions 66.

Support brackets 60 have upper and lower edges 70 and 72 and inner and outer surfaces 74 and 76 respectively. Chafer 10 also includes a pair of shelf supports 78. Shelf supports 78 are connected to support brackets 60, preferably at a midpoint 79 thereof. Shelf supports 78 extend downwardly from support brackets 60 and are connected at a lower end 80 thereof to shelf 30. Shelf supports 78 are preferably integrally connected or formed with shelf 30 and are perpendicular thereto.

Shelf 30 supports a pair of burners 84 of a type known in the art. Inner rim 38, specifically supports brackets 60, support water pan 20 for holding water 88 therein. Water pan 20 has a bottom 90, and in the embodiment shown is a generally rectangularly shaped water pan. Water pan 20 has front and back sides 92 and 94 respectively and first and second ends 96 and 98 respectively connected to and extending upwardly from bottom 90. Water pan 20 has a peripheral rim 100 extending from the upper edge of front and back sides and first and second ends 92, 94, 96 and 98 respectively. Peripheral rim 100 comprises an outwardly extending flange 102 and a flange 104 connected thereto and extending downwardly therefrom. A peripheral spacer 103 which may be integrally formed with or which may be attached to water pan 20 extends upwardly from the upper edges of the sides and the ends thereof for supporting food pan 25.

Food pan 25 is a generally rectangularly shaped food pan having a bottom 106 and having sides 108 extending upwardly therefrom to an upper edge 110. Food pan 25 has a peripheral rim 112 which comprises an outwardly extending flange 114 connected to upper edge 110 and a flange 116 connected to and extending downwardly from an outer end of flange 114. Food pan 25 rests on and is supported by spacer 103 is thus supported by water pan 20 and framework 15.

As set forth above rolltop 32 is connected to framework 15 by means of a lock mechanisms 33. Rolltop 32 has first and second sides 118 and 120 respectfully and semi-cylindrical top portion 121. Top 30 has a rim 122 at the lower edge 124 thereof. Rim 122 comprises a flange 126 connected to lower edge 124 and a flange 128 connected to and extending from flange 126. When top 32 is in the closed position, flange 126 extends inwardly and flange 128 extends upwardly from flange 126 so that rim 122 defines a channel. Top 32 has an inner surface 128 and an outer surface 130.

As is known in the art, when food is being heated in chafer 10, condensate tends to collect on the inner surface 128 of rolltop 30. The condensate that collects will roll down the surface of the rolltop when it is in its closed position will be collected in rim, or channel 122. Flange 126 of channel 122 has an opening 132 defined therethrough so that condensate that is collected in channel 122 will drip therethrough.

The invention includes a water return 134 for collecting water that passes through opening or drain 132 and for communicating the condensate back into water pan 20. Return 134 comprises a spout, which is an inverted spout 136 connected to a side of water pan 20, that will receive the condensate passing through drain 132. An opening 138 is defined through front side 92 of water pan 25 so that the water collected by spout 136 is returned to water pan 20 through opening 138.

Chafer 10 includes two lock mechanisms 33, shown more clearly in FIGS. 3, 5 and 9, positioned on opposite sides of the framework 15. Each lock mechanism 33 comprises a lug 140 having an inner, or inward facing surface 142, and an outer or outward facing surface 144. Lug 140 is connected to inner rim 38 with screws, other threaded fasteners, or by any means known in the art. Lug 140 has at least one and preferably has a plurality of lock receptacles 146 defined on the outward facing surface 144 thereof. In the embodiment shown, each lug 140 has two lock receptacles 146 which are preferably cavities defined in the outward facing surface 142 of lug 140. The two cavities 146 are peripherally spaced apart and are preferably spaced 180° apart from one another around the lug. The cavities are thus directly opposed from one another.

An axle 150 is connected to and extends outwardly from outer surface 144. Axle 150 has an inner end 151, an outer end 152, and has a longitudinal central axis 153, which is the common longitudinal central axis for both axles 150 and for both lock mechanisms 33. Axle 150 likewise has an internal thread 154 at the outer end 152 thereof. Axle 150 also has a central notch or groove 156 between the inner and outer ends 151 and 152 thereof. Axle 150 also has a pair of opposed notches 158 at the outer end 152 thereof.

Figure 10:
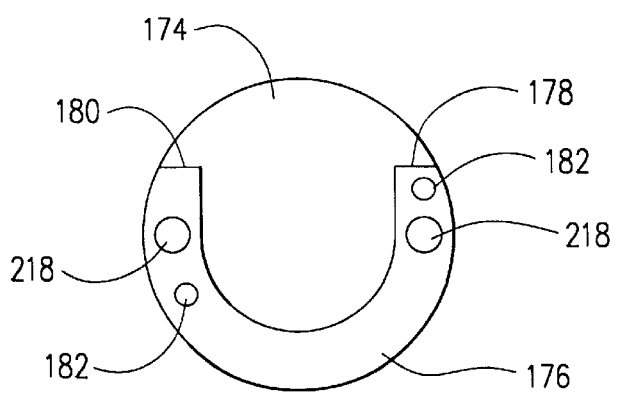
FIG. 10 is a view from line 10—10 of FIG. 9.

A mounting hub 160 is rotatably disposed about axle 150. Mounting hub 160 comprises a support ring 162 having a mounting cap 164 connected thereto with a screw or other threaded fastener 166 or by any other means known in the art. Rolltop 32 is connected to mounting caps 164 with fasteners 168 or by any other means known in the art. Support ring 162 comprises an inner support ring 170 and an outer support ring 172. Inner support ring 170 comprises a generally circular disk or disk portion 174 having a peripheral flange 176 extending around a portion of the periphery of circular disk 174. As shown in FIG. 10, flange 176 has ends 178 and 180 and has threaded openings 182 therethrough for the receipt of fasteners or other connecting means to connect inner support ring 170 to outer support ring 172. Central opening 185 is defined through inner support ring 170 so that support ring 170 may be rotatably disposed about axle 150. Outer support ring 172 comprises an outer generally circular housing 184 having an inner housing 186 disposed and fixed therein. Inner housing 186 is preferably Teflon, or other material that will provide for easy rotation about axle 150, which is received in an opening 188 defined in inner housing 186. Openings 190 through outer housing 184 will mate with openings 182 so that fasteners 191 can be received therethrough to attach outer support ring 172 to inner support ring 170.

Lock mechanism 33 also includes a cap or hub 192. Cap or hub 192 engages the outer surface 50 of outer rim 36 so that outer rim 36 is between cap 192 and outer support ring 172. Cap 192 is a two-piece cap comprising an outer cap 194 having a first outer diameter 196 and a second outer diameter 198, and a spacer or inner cap 200 disposed about inner diameter 198. A counterbore 202 is defined in the outer surface of cap 194. A fastener 204 is received through an opening 206 in outer cap 194 so that the head thereof is received in counterbore 202. Fastener 204 is threaded into threaded opening 154 in axle 150 to attach the cap thereto, so that spacer 200 is engaged with outer rim 36.

Lock mechanism 33 includes at least one, and preferably a plurality of locking elements 210, and in the embodiment shown includes two locking elements 210. Locking elements 210 comprise spherical locking elements. Lock mechanism 33 further includes at least one and preferably a plurality, and in the embodiment shown two biasing elements 212, which may comprise springs 212. Springs 212 have a first end 214 and a second end 216. First end 214 engages mounting hub 160 and second end at 216 engages spherical locking element 210 and biases locking element 210 into engagement with outer surface 144 of lug 140.

Figure 4:
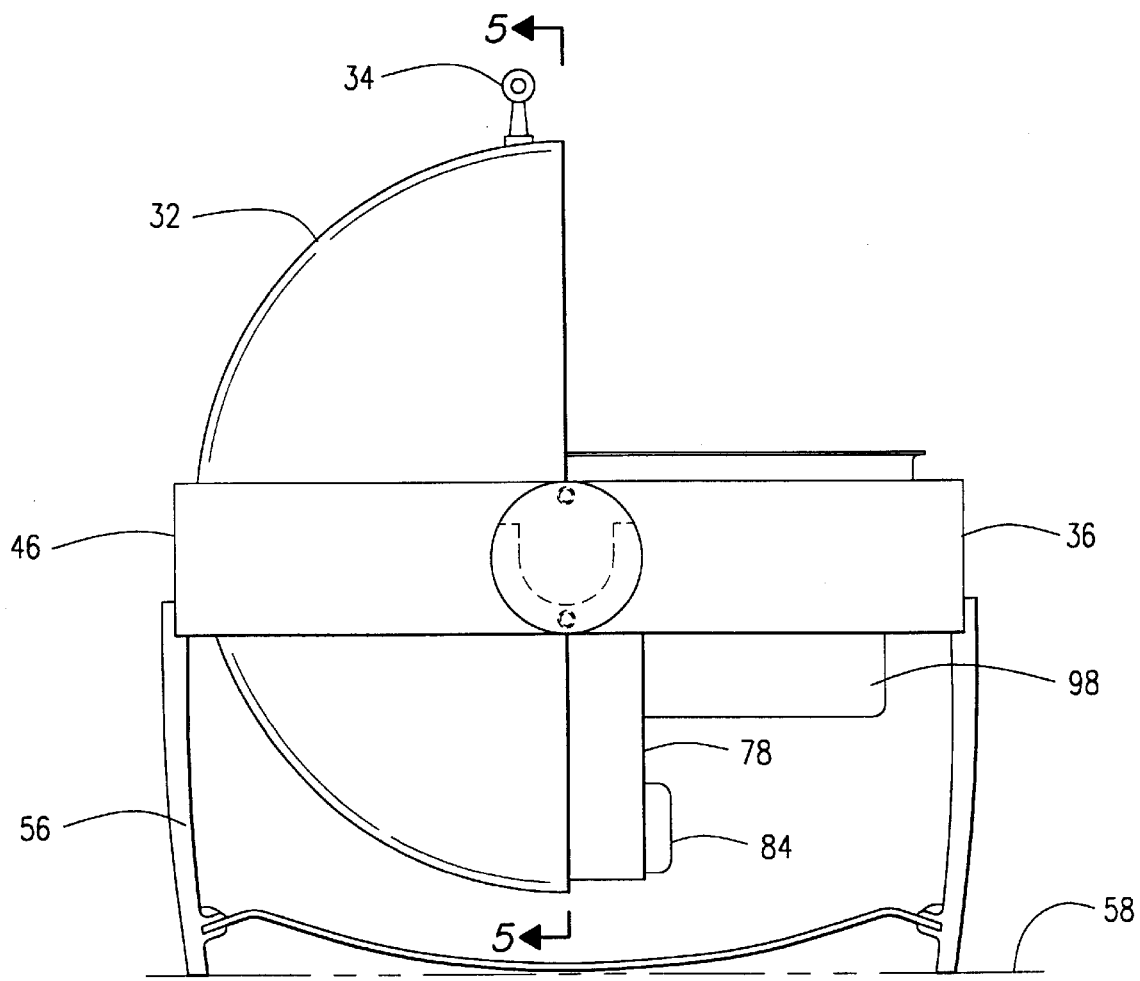
FIG. 4 is a side view of the chafer of the present invention in a partially open position.

Mounting hub 160 and more particularly inner support ring 170 has at least one and preferably a plurality, and in the embodiment shown two passageways 218 extending from an inner surface 220 of mounting hub 160 through inner support ring 170 and terminating at outer support ring 172 which comprises a base 222 for springs 212. Springs 212 are received in passageways 218. In the embodiment shown the passageways are spaced 180° from one another and are thus spaced directly on opposite sides of longitudinal axis 153 of locking mechanism 33. Locking mechanism 33 is shown in FIG. 3 in cross section, with rolltop 32 in its closed position. In the closed position springs 212 will engage locking elements 210 and urge them into surface 144 of lug 140. Rotation of the rolltop from the closed position through about 90° to the desired open position of the rolltop 32 as shown in FIG. 4 will bring spherical elements 210 into engagement with locking receptacles 146 as shown in FIG. 5. Springs 212 will urge locking elements 210 into receptacles 146 with sufficient force so as to releasably lock rolltop 32 in the desired open position. Thus, in the desired open position, the rolltop is releasably locked such that it is not necessary to hold the top to keep it open, or to apply any other forces other than those applied by springs 212. If it is desired to move the rolltop to the fully open position or to the closed position, the only manipulation required is to apply moving force in the direction of the desired movement which will cause locking elements 210 to be moved out of the locking receptacles 146. Although only one partially open position has been shown and described, locking elements and locking receptacles can be positioned as desired so that a chafer can have one, or more than one partially open position in which the rolltop will be releasably locked. Thus, chafer 10 of the present invention has a self-locking, self-contained locking mechanism in that the only manipulation required to lock the rolltop in a desired position is movement of the rolltop to the desired position, and the only manipulation required to unlock, or release the rolltop is the application of a moving force in the desired direction, sufficient to overcome the locking forces applied by the springs. Furthermore, the locking mechanism of the present invention avoids contamination, and also requires no manipulation of any parts other than the rolltop itself for movement in a direction towards the closed or open position from the partially open locked position. Prior art chafers required additional manipulation to lock and/or unlock the rolltop.

Although the invention has been described by reference to a preferred embodiment it is not intended that the invention be limited thereby, but that modifications thereof are intended to be included as falling within the scope and spirit of the foregoing disclosure, the following claims and the appended drawings.

What is claimed is:

1. A food chafer comprising:
   a framework for supporting a food pan; and
   a rolltop rotatably connected to said framework for covering said food pan, said rolltop being rotatable between a closed position wherein said top covers said food pan and a fully open position wherein said food pan is accessible for removal from said food chafer, and being releasably lockable in a partially open locked position between said fully open and closed positions, wherein said top is releasable for movement from said partially open locked position in a direction toward either of said closed or fully open positions, and wherein the only manipulation required to release the rolltop from the locked position for movement in either direction is the application to the rolltop of a moving force in the desired direction of movement.

2. The food chafer of claim 1, further comprising a lock mechanism mounted to said framework, wherein said rolltop is fixed to said lock mechanism and wherein said lock mechanism provides for rotation of said rolltop relative to said frame.

3. A food chafer comprising:
a framework for supporting a food pan;
a pair of lock mechanisms, said lock mechanisms being connected to said framework and having a common longitudinal central axis; and
a rolltop rotatably connected to said framework for covering said food pan and fixed to said lock mechanism, wherein said lock mechanism provides for rotation of said rolltop relative to said frame between a closed position wherein said top covers said food pan and a fully open position wherein said food pan is accessible for removal from said food chafer, wherein said rolltop is releasably lockable in a partially open locked position between said fully open and closed positions, wherein said top is releasable for movement from said partially open locked position in a direction toward either of said closed or fully open positions, and wherein the only manipulation required to release the rolltop from the locked position for movement in either direction is the application to the rolltop of a moving force in the desired direction of movement.

4. A food chafer comprising:
a framework for supporting a food pan, said framework comprising an outer rim, a plurality of legs connected to said outer rim and extending downward therefrom to a support surface, and an inner rim spaced inwardly from said outer rim for supporting said food pan;
a lock mechanism mounted to said framework; and
a rolltop rotatably connected to said framework for covering said food pan and fixed to said lock mechanism, wherein said lock mechanism provides for rotation of said rolltop relative to said frame, said rolltop being rotatable between a closed position wherein said top covers said food pan and a fully open position wherein said food pan is accessible for removal from said food chafer, and being releasably lockable in a partially open locked position between said fully open and closed positions, wherein said top is releasable for movement from said partially open locked position in a direction toward either of said closed or fully open positions, and wherein the only manipulation required to release the rolltop from the locked position for movement in either direction is the application to the rolltop of a moving force in the desired direction of movement.

5. The food chafer of claim 4, said lock mechanism comprising:
a lug connected to said inner rim;
an axle attached to said lug and extending outwardly from said lug; and
a mounting hub rotatably disposed about said axle, said rolltop being fixedly attached to said mounting hub.

6. The food chafer of claim 5, further comprising a spring disposed in a passageway defined in said mounting hub, said passageway extending from an inner surface of said mounting hub partially through said hub and terminating at a base, wherein said inner surface of said mounting hub is adjacent to and spaced from an outward facing surface of said lug; and
wherein said spring engages a locking element and urges said locking element into engagement with said outward facing surface of said lug, said lug defining a lock receptacle therein for receiving said locking element, said lock receptacle being located so that when said rolltop is rotated to said partially open position, said spring will urge said lock element into said lock receptacle to releasably lock said top in said partially open position.

7. The food chafer of claim 5, wherein said mounting hub defines a plurality of spring openings for receiving a spring, wherein each spring received in a spring opening engages a locking element, the lugs having a plurality of lock receptacles positioned at predetermined locations, and wherein said springs urge said locking elements toward said lock receptacles, so that said rolltop will be releasably locked in a desired position when any of said locking elements engage any of said lock receptacles.

8. The food chafer of claim 6, further comprising:
two of said passageways defined in each said mounting hub, said passageways being spaced apart from each other, each passageway having a spring received therein, wherein each spring engages a locking element and biases said locking element toward said lug; and
said lug defining two lock receptacles spaced apart from one another, wherein in said closed position said locking elements are spaced from said lock receptacles such that rotation of said rolltop about 90° from said closed position will cause said locking elements to engage said lock receptacles to releasably lock said top in said partially open position.

9. The food chafer of claim 5, said axle having an inner end and an outer end, the chafer further comprising:
a cap connected to the outer end of said axle.

10. A food chafer comprising:
a framework for supporting a food pan, said framework comprising an outer rim having legs attached thereto, an inner rim spaced inwardly from said outer rim, wherein said food chafer further comprises a water pan supported by said inner rim, said water pan having a water return spout, and
a rolltop rotatably connected to said framework for covering said food pan, said rolltop defining a condensate opening for allowing condensate that forms on said rolltop to drip therethrough, wherein said condensate that passes through said opening is collected by said water return spout and communicated into said water pan, said rolltop being rotatable between a closed position wherein said top covers said food pan and a fully open position wherein said food pan is accessible for removal from said food chafer, and being releasably lockable in a partially open locked position between said fully open and closed positions, wherein said top is releasable for movement from said partially open locked position in a direction toward either of said closed or fully open positions, wherein the only manipulation required to release the rolltop from the locked position for movement in either direction is the application to the rolltop of a moving force in the desired direction of movement.

11. A food chafer for holding a food pan comprising:
a framework for supporting said food pan;
first and second axles mounted to said framework;
a mounting hub rotatably disposed about each axle; and
a rolltop for covering said food pan, said rolltop being fixedly connected to said mounting hubs so that said rolltop is adapted to rotate from a closed position wherein said food pan is covered by said rolltop to a desired open position wherein said food pan is accessible for removing food therefrom, and wherein said mounting hubs are releasably lockable in said desired open position, said hubs being releasable for rotation from said desired open position toward and away from said closed position solely by application of a moving force in the desired direction.

12. A food chafer for holding a food pan comprising:
a framework for supporting said food pan;
first and second axles mounted to said framework;
a mounting hub rotatably disposed about each axle; and
a rolltop for covering said food pan, said rolltop being fixedly connected to said mounting hubs so that said rolltop is adapted to rotate from a closed position wherein said food pan is covered by said rolltop to a desired open position wherein said food pan is accessible for removing food therefrom, and wherein said mounting hubs are releasably lockable in said desired open position, said hubs being releasable for rotation from said desired open position toward and away from said closed position solely by application of a moving force in the desired direction.

13. The food chafer of claim 12 wherein each said mounting hub comprises:
a support ring rotatably disposed about its respective axle; and
a mounting cap connected to said support ring, said rolltop being connected to said mounting cap.

14. The food chafer of claim 12 further comprising:
a locking element operably associated with each said mounting hub for releasably locking said mounting hub in said desired open position; and
biasing means for urging said locking element into engagement with a locking element receptacle, wherein said top is releasably locked when said locking element engages said locking receptacles.

15. The food chafer of claim 14 further comprising:
two lugs connected to said inner rim, wherein each said axle is connected to a lug and extends outwardly therefrom toward said outer rim.

16. The food chafer of claim 15, wherein said biasing means comprises a spring having first and second ends, said first end engaging said mounting hub and said second end engaging said locking element, each locking receptacle comprising a cavity defined in said lug for receiving a locking element.

17. The food chafer of claim 16, wherein rotation of said top from said closed position into said desired open position will cause said locking elements to be received in said locking receptacles.

18. The food chafer of claim 16, wherein each said mounting hub defines a pair of passages extending from an inward surface thereof partially through said mounting hub and wherein each mounting hub has a pair of locking elements operably associated therewith, each said passage having a spring received therein, wherein said spring biases said locking elements into engagement with an outer surface of said lug, each said lug having a pair of locking receptacles for receiving said locking elements.

19. The food chafer of claim 18, wherein said locking elements maintain constant engagement with said lug, and wherein rotation of said mounting hub rotates said locking elements relative to said lug to move said locking elements in and out of said locking receptacles.

20. A food chafer for holding a food pan comprising:
a framework for supporting said food pan;
first and second axles mounted to said framework;
a mounting hub rotatably disposed about each axle;
a rolltop for covering said food pan, said rolltop being fixedly connected to said mounting hubs so that said rolltop is adapted to rotate from a closed position wherein said food pan is covered by said rolltop to a desired open position wherein said food pan is accessible for removing food therefrom, and wherein said mounting hubs are releasably lockable in said desired open position, said mounting hubs being releasable for rotation from said desired open position toward and away from said closed position solely by application of a moving force in the desired direction;
a water pan supported by said frame; and
a burner for heating water in said water pan, said rolltop having an opening for allowing condensate forming on said rolltop to drip therethrough, wherein said water pan has a water return for collecting said condensate passing through said opening and delivering said condensate into said water pan.

21. The food chafer of claim 20, wherein said water return comprises an inverted spout for collecting said condensate, and wherein said spout directs said condensate through an opening defined in a side of said water pan.

22. A food chafer comprising:
a framework;
a water pan for holding water supported by said framework;
a food pan supported by said water pan and positioned so that a bottom thereof is located above a bottom of said water pan;
a rolltop for removably covering said food pan, said rolltop including a drain for draining condensate that collects on said rolltop; and
a condensate collector for collecting said condensate from said drain and delivering said condensate to said water pan.

23. The food chafer of claim 22, said rolltop comprising a downward facing rolltop having a lower edge in a closed position of the rolltop, said rolltop having an inwardly extending flange connected to said lower edge, wherein said drain comprises an opening in said inwardly extending flange.

24. The food chafer of claim 23, said condensate collector comprising a spout connected to said water pan, said water pan having a hole in a side thereof for receiving condensate collected by said spout.

25. The food chafer of claim 22, said rolltop being moveable from a closed position wherein said food pan is covered, to an open position wherein said top allows sufficient access to remove said food pan, said top being releasably lockable in a partially open locked position between said closed and said filly open position.

26. The food chafer of claim 25, wherein said rolltop is released from said partially open locked position for movement toward either of said open or closed position solely by the application of force in the desired direction.

27. A food chafer comprising:

a framework for supporting a food pan;

a self-locking, self-contained locking mechanism connected to said framework; and a rolltop connected to said self-locking, self-contained locking mechanism, wherein the locking mechanism provides for rotation of said rolltop between a closed position and a fully open position, and will releasably lock said rolltop in a desired open position between said closed and fully open position.

28. A food chafer comprising:

a framework for supporting a food pan;

two self-locking, self-contained locking mechanisms connected to said framework; and a rolltop connected to said self-locking, self-contained locking mechanisms, wherein the locking mechanism provides for rotation of said rolltop between a closed position and a fully open position and will releasably lock said rolltop in a desired open position between said closed and fully open position.

29. The food chafer of claim 28, wherein said locking mechanisms have a common longitudinal central axis.

30. A food chafer comprising:

a framework for supporting a food pan;

a self-locking, self-contained locking mechanism connected to said framework, said locking mechanism comprising an axle mounted to said framework, and a mounting hub rotatably disposed about said axle; and a rolltop connected to said mounting hub, wherein said locking mechanism provides for rotation of said rolltop between a closed position and a fully open position and will releasably lock said rolltop in a desired open position between said closed and fully open position.

31. The food chafer of claim 30, the locking mechanism further comprising:

a locking element rotatable with said mounting hub; and a locking receptacle operably associated with said mounting hub, wherein rotation of said mounting hub will move said locking element into engagement with said locking receptacle, thereby releasably locking said rolltop in said desired open position.

32. The food chafer of claim 31, the locking mechanism comprising at least two locking elements and at least two locking receptacles.

33. The food chafer of claim 31, said mounting hub defining a passage for holding a biasing element, wherein said biasing element engages said locking element to urge said element into said locking receptacle.

* * * * *

UNITED STATES PATENT AND TRADEMARK OFFICE
CERTIFICATE OF CORRECTION

PATENT NO. : 6,640,798 B2
DATED : November 4, 2003
INVENTOR(S) : Inhwan Ahn

It is certified that error appears in the above-identified patent and that said Letters Patent is hereby corrected as shown below:

<u>Title page,</u>
Item [12], Inventor, delete "Anh" and insert -- Ahn -- therefor.
Item [30], Foreign Application Priority Data, delete "30-2000-0028922" and insert -- 20-2000-0028922 -- therefor;

<u>Column 5,</u>
Line 46, after "other" and before "material," insert -- friction reducing --.

<u>Column 10,</u>
Line 63, delete "filly" and insert -- fully -- therefor.

Signed and Sealed this

Ninth Day of March, 2004

JON W. DUDAS
*Acting Director of the United States Patent and Trademark Office*